United States Patent [19]

Mash et al.

[11] 4,123,735

[45] Oct. 31, 1978

[54] INDUCTION-TYPE METER FOR MEASURING MECHANICAL QUANTITIES

[76] Inventors: Dmitry M. Mash, ulitsa Lenskaya 14, kv. 34; Savely S. Schedrovitsky, 13 Parkovaya ulitsa 25 korpus 1, kv. 12; Zoya I. Golovko, Chengarsky bulvar 22, korpus 2, kv. 50; Mikhail P. Zaitsev, Butikovsky pereulok 5, kv. 25; Andrei N. Sorokin, Festivalnaya ulitsa 41, kv. 43; Agnia A. Belyaeva, Angarskaya ulitsa 29, kv. 9; Ivan I. Kharitonov, Khlebozavodskoi proezd 8, korpus 2, kv. 149, all of Moscow, U.S.S.R.

[21] Appl. No.: 772,684

[22] Filed: Feb. 28, 1977

Related U.S. Application Data

[63] Continuation of Ser. No. 553,026, Feb. 25, 1975, abandoned.

[51] Int. Cl.² .............................................. H01F 21/04
[52] U.S. Cl. ..................... 336/30; 73/141 A; 336/75; 336/79; 336/87; 336/179
[58] Field of Search ................ 336/30, 75, 77, 79, 336/119, 120, 179, 117, 118, 87; 324/34 D; 331/181; 73/141 A; 335/225, 226

[56] References Cited

U.S. PATENT DOCUMENTS

| | | | |
|---|---|---|---|
| 2,366,639 | 1/1945 | Moore | 336/79 X |
| 2,611,266 | 9/1952 | Wiancko | 73/141 A |
| 2,689,951 | 9/1954 | Argentieri et al. | 336/79 X |
| 2,719,430 | 10/1955 | Dillon | 73/141 A |
| 2,778,942 | 1/1957 | Ehret et al. | 331/181 X |
| 2,976,495 | 3/1961 | Unger | 336/79 X |
| 3,090,933 | 5/1963 | Baudot | 336/79 X |
| 3,161,793 | 12/1964 | Laithwaite | 335/226 X |
| 3,240,057 | 3/1966 | Ormond | 73/141 A |
| 3,471,844 | 10/1969 | Schugt | 336/87 X |
| 3,617,964 | 11/1971 | Bocksruker | 336/30 |

FOREIGN PATENT DOCUMENTS 861,153  2/1961  United Kingdom ................. 324/34 D Primary Examiner—Thomas J. Kozma
Attorney, Agent, or Firm—Holman & Stern

[57] ABSTRACT

An induction-type meter for measuring mechanical quantities, comprising a first converter to convert the controlled parameter into a displacement and having elements adapted to be moved relative to each other, and a second converter to convert the displacement into an electric signal and including a magnetic circuit with a block of coils mounted on one of the elements capable of relative movement, and a diamagnetic screen mounted on the other element capable of relative movement. The magnetic circuit is embodied as a closed-open loop system comprised of two parallel parts formed by armored cores mounting said coils and arranged to provide a gap accommodating said diamagnetic screen with profiled working edges.

2 Claims, 9 Drawing Figures

INDUCTION-TYPE METER FOR MEASURING MECHANICAL QUANTITIES

This is a continuation of application Ser. No. 553,026, filed Feb. 25, 1975 now abandoned.

BACKGROUND OF THE INVENTION

The present invention relates to measuring devices and more particularly to induction-type meters for measuring mechanical quantities, which meters are useful for measuring force, torque, vibration, acceleration, displacement, and the like.

Induction-type meters for measuring mechanical quantities are used in technology for converting various displacements caused by controlled parameters into an electric signal suitable for remote control, the meters comprising a converter to convert the controlled parameter into a displacement, a converter to convert the displacement into an electric signal and an electric measuring circuit for shaping a specific signal at the output thereof.

Known in the art are various designs of induction-type and transformer converters to convert displacements into electric signals (having variable sizes of magnetic gap, variable gap area, solenoid-operated, magnetoelastic, and the like), operating at frequencies of up to 1000 Hz.

Such converters for converting displacements into electric signals, as a rule, include a closed-loop magnetic circuit, an exciting coil, measuring coil, and a movable armature connected to the object being displaced.

Their common disadvantage resides in the fact that they feature limited sensitivity and accuracy which is due to the readings thereof being dependent on uncontrollable incontrollable mutual displacements of the coils and the armature, which disadvantage requires the use of guides and requires a higher degree of sophistication of the design. Moreover, they suffer from the appearance of a reverse effect which can be reduced by decreasing the value of output signal, which in turn necessitates the use of involved secondary apparatuses, limits the distance between the displacement converter and the amplifier of the electric measuring circuit and restricts the field of application for the converters.

Also known in the art are induction-type converters for converting displacements into electric signals, also comprising a field coil, a measuring coil, but with a magnetic screen, the coils of these converters being connected into the circuit of high-frequency oscillators and changing their inductivity in response to the displacement of a metal plate (screen) connected to an element adapted to respond to a variation of force, torque, and other controlled parameters.

Such converters for converting displacements into an electric signal make use of an open-loop, magnetic circuit system, which permits the setting of several coils at various required distances relative to each other and the use of variously shaped screens, which features permit a variation in the range of measurements and the slope of the static characteristic of the meters.

However, the above-described converters also have their disadvantages, residing in the presence of considerable effects of uncontrolled transverse displacements of the screen, a low degree of contact between mutually inductive coils which reduces the output signal level, and also in the mutual effect of coils which are not inductively coupled to each other.

In the cases discussed above, the magnetic circuits of converters for converting displacement into electric signals can be embodied in any conventional shape, such as an E-shape, U-shape, cup-shape, and the like.

Also known in the art is an induction-type converter for measuring mechanical quantities, including a converter to convert the controlled parameter into a displacement, a converter to convert the displacement into an electric signal, wherein the first converter features elements adapted to be moved relative to each other in response to a change in the controlled parameter, which elements mount a magnetic circuit with a block of coils coupled to the circuit of self-excited oscillator and a metal screen of the second converter.

Any change of the controlled parameter, for example, force, results in a relative displacement of the coil block and the screen, thus changing in turn the coefficients of mutual inductance of the coils, which leads to the appearance of a resultant voltage across the output of the differential electric measuring circuit (differential transformer).

A disadvantage which is common to all conventional meters for measuring mechanical quantities is a rather involved design resulting from the requirement to provide special devices for protecting the converter for converting the controlled parameter into a displacement from lateral components of the load, and for protecting the converter for converting the displacements into an electric signal from transverse displacements, as well as stiff requirements imposed on the installation of said mechanical quantities meters in the designated place.

Another disadvantage of the above-described meters resides in the difficulties experienced in adjusting and matching the working stroke in response to a preset conversion characteristic or when correcting same in response to environmental effects, or a temporary change of the characteristic.

SUMMARY OF THE INVENTION

It is an object of the present invention to provide an induction-type meter for measuring mechanical quantities, combining the advantages of closed-loop and open-loop magnetic circuits in which the above-described disadvantages would be avoided.

Particularly, a considerable working gap should be provided between the coils with inductive coupling, which gap should be sufficiently large to prevent the effect of uncontrolled (transverse) displacements of the screen on the value of the output signal. The field configuration of the induction-coupled coils must be such as to ensure the possibility of using screens having any required profile of the working edge.

The magnetic field must encompass only the induction-coupled coils and there must be no magnetic field in the region of other coils. The magnetic system must permit the induction non-coupled coils to be arranged in the required position and ensure the possibility of their movement as a result of adjustment of the meter, a change of its characteristic or correction of the characteristic in response to changing external factors.

The foregoing and other objects are achieved in an induction-type meter for measuring mechanical quantities, comprising a first converter for converting the controlled parameter into a displacement and having elements capable of relative movement, and a second converter to convert the displacement into an electric signal and including a magnetic circuit with a block of coils mounted on one of the two elements capable of relative is movement a diamagnetic screen mounted on the other element capable of relative movement of the first converter, wherein, according to the invention, the magnetic circuit is embodied as a closed-open loop system comprised of two parallel parts formed by armored cores, with said coils mounted thereon and arranged to provide a gap, the gap accommodating a diamagnetic screen having profiled working edges.

In order to adjust the displacement conversion characteristic into an electric signal, said coil block and said diamagnetic screen are preferably embodied with a provision for movement relative to each other.

The adjustment of the characteristic of displacement conversion into an electric signal is preferably achieved by a provision for relative movement of said diamagnetic screen and said block of coils.

Automatic correction of the conversion characteristic in response to varying external conditions to preferably achieved by providing the induction-type meter for measuring mechanical quantities with a corrector drive means, serving to change the angle between the working edge of the diamagnetic screen and the direction of displacement thereof.

The induction-type meter for measuring mechanical quantities according to the present invention features the following advantages over the prior art meters:

1. It permits local shorting the magnetic circuit of the oppositely disposed coils, thus permitting the gap between said coils to be increased (at a high signal level) and also reduces the level and effect of random screen displacements in the working gap, which is achieved by using specially shaped cores.
2. The open-loop magnetic system of adjacent coils permits the coils to be disposed at any distance from each other, thus changing the range of measurement, whereas the shape of the magnetic field created by the armored cores permits the slope of the converter characteristic to be changed or the creation of a characteristic having any desired shape by changing the angle of slope of the screen edges relative to the axis of its displacement.
3. The fact that the shield and the coils are mounted on constructional elements that are capable of relative movement and that the edges of the screen are profiled simplifies the adjustment of the meter, ensuring a preset converter characteristic and/or the adjustment thereof in response to a temporary change of the characteristic.
4. It provides the possibility of carrying out automatic correction depending on changing external conditions, with the help of a corrector drive means.

The meter according to the present invention permits the level of the output signal to be increased 5 to 10 times with simultaneous similar reduction of power demand as compared with the prior art induction, ferrodynamic and other meters.

The meter according to the present invention features high accuracy which is 2 to 3 times better than that of a meter having an open-loop magnetic circuit, whereas the time required for its adjustment under service conditions is substantially less (by a factor of 3 to 5) as compared with other types of meters. In addition to that, the quality requirements for the manufacture of the present meters for measuring mechanical quantities are considerably less stringent.

On the whole, the present invention permits a substantial improvement of meterologic characteristics with simultaneous reduction of the requirements for setting the present meter at the point of installation, and also provides a device of a rather simple construction.

BRIEF DESCRIPTION OF THE DRAWINGS

The present invention will now be explained in greater detail with reference being had to the preferred embodiments thereof which are represented by the accompanying drawings, wherein.

DETAILED DESCRIPTION OF THE PREFERRED EMBODIMENT

Figure 1:
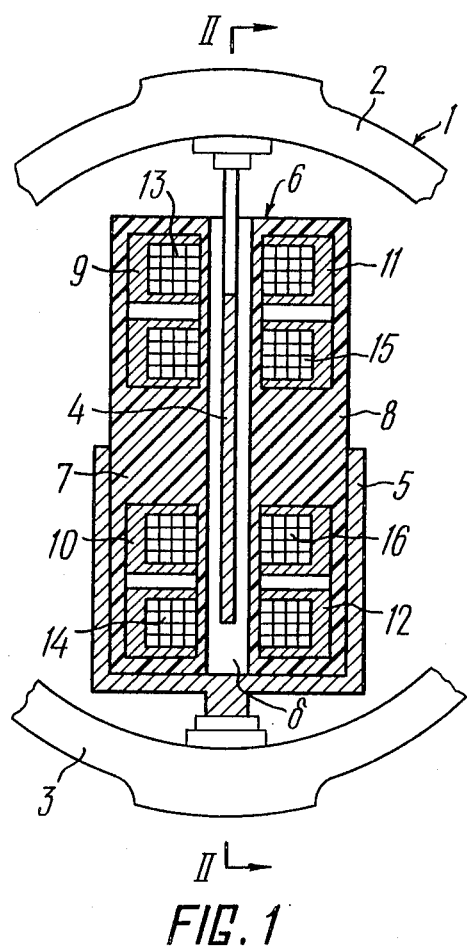
FIG. 1 illustrates a general view of an induction-type meter for measuring mechanical quantities, according to the invention.

An induction-type meter for measuring mechanical quantities, for example, force, comprises a resilient force meter 1, which is a converter effecting conversion of the controlled parameter into displacement (FIG. 1), the elements 2 and 3 thereof, which are capable of relative movement, mount a profiled diamagnetic screen 4 on the one side, and on the other side- a bracket 5 with a magnetic circuit 6 secured thereto, the magnetic circuit 6 comprising two parallel parts 7 and 8, disposed in such a manner as to form a gap "δ" between them and made in the form of armored cores 9, 10, 11 and 12, with induction coils 13, 14, 15 and 16 wound thereon.

The magnetic circuit 6 with the induction coils 13, 14, 15 and 16, together with the screen 4 form a converter to convert displacements into an electric signal of a transformer type.

Figure 2:
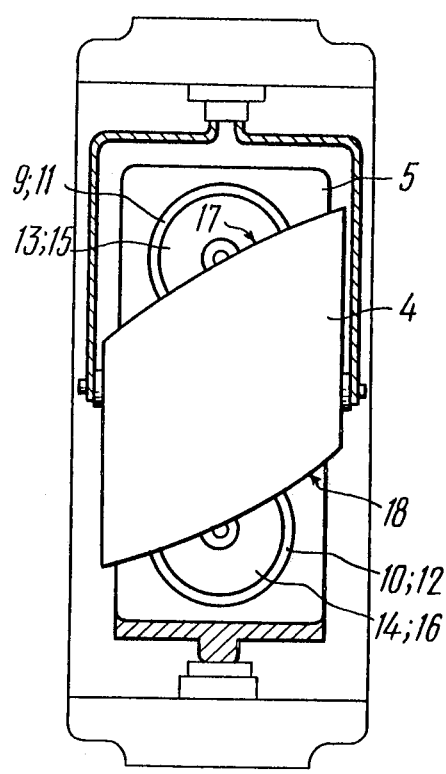
FIG. 2 shows a longitudinal section of the meter of FIG. 1.

FIG. 2 illustrates a longitudinal section of the above described induction-type meter for measuring mechanical quantities, showing the screen 4 with working edges 17 and 18 profiled according to the required law, the screen 4 partially overlapping the electromagnetic field of the cores 9, 10, 11 and 12.

Figure 3:
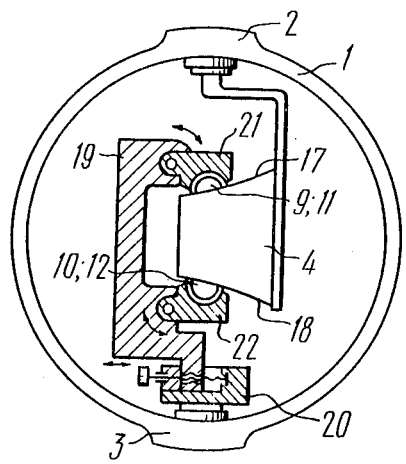
FIG. 3 illustrates an induction-type meter wherein the coil cores are mounted on movable brackets.

In FIG. 3 said armored cores 9, 10, 11 and 12 are mounted on a bracket 19 with a provision for movement along guides 20 (the arrows indicating the direction of movement of cores 9, 10, 11 and 12 and the bracket 19). For the purpose of their adjustment, the armored cores 9, 10, 11 and 12 are mounted on articulated brackets 21 and 22. The mitred working edges 17 and 18 of the diamagnetic screen 4 ensure zero setting when adjusting the system.

Figure 4:
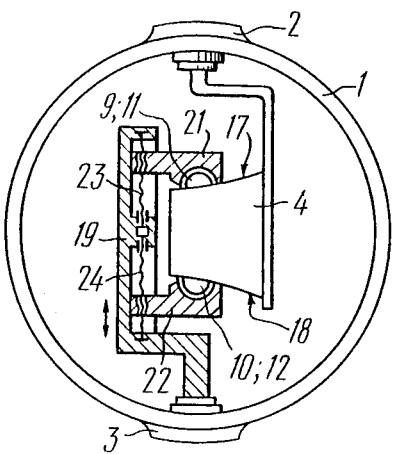
FIG. 4 shows another embodiment of the meter of FIG. 3.

FIG. 4 illustrates another embodiment of movable armored cores 9, 10, 11 and 12, namely: the brackets 21 and 22, which are supporting said cores, are moved along the bracket 19 by means of screws 23 and 24 having a left-hand and a right-hand thread, respectively, thereby effecting the adjustment of the meter of mechanical quantities. The arrows indicate the direction of movement of brackets 21 and 22.

The possibility of such a simple and convenient adjustment is a novel feature of the induction-type meter according to the present invention, achieved owing to the low sensitivity of the construction with respect to uncontrolled displacements of the shield and the coils.

The specific method for moving the brackets 19, 21 and 22 is dependent on the type of the resilient element used for providing the force meter 1, also the specific parts used in the construction of the present induction-type meter.

The working edges 17 and 18 of the screen 4 can be profiled according to any desired law.

Figure 5:
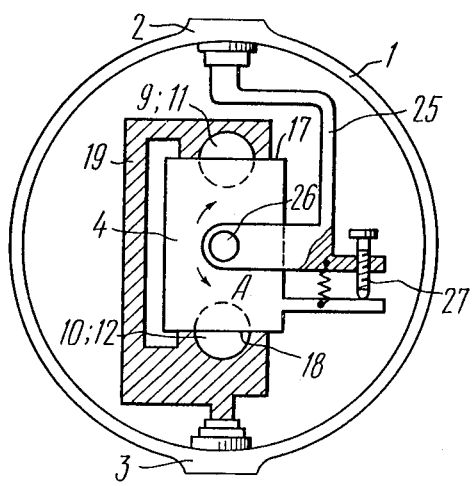
FIG. 5 illustrates an induction-type meter with the screen mounted on a movable element.

In FIG. 5, the shield 4 is mounted on the bracket 25 with a provision for movement, thereby facilitating the adjustment thereof and permitting the required conversion characteristics to be obtained. In accordance with FIG. 5, the shield 4 is mounted on the bracket 25 on pivot 26. As the shield 4 is rotated by means of the adjusting means 27, the angle between its working edge 17, 18 and the direction of movement will be changed, thereby correspondingly contracting or expanding its conversion characteristic. The arrows indicate the direction of displacement of screen 4 relative to the pivot 26.

Figure 6:
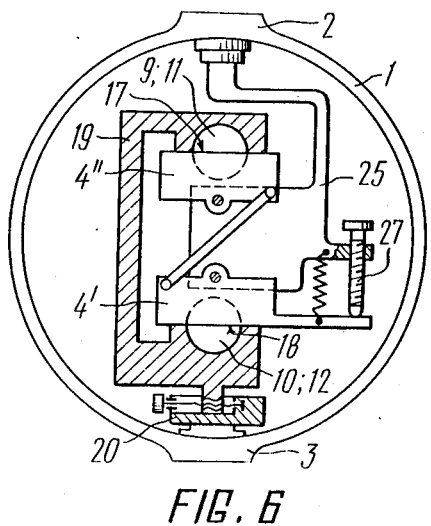
FIG. 6 shows another embodiment of the meter of FIG. 5.

FIG. 6 illustrates another embodiment of the movable screen 4, comprising two similar parts (elements) 4' and 4", articulated together in such a manner that a displacement of the adjusting means 27, causes the working edges 17 and 18 of the screen parts 4 to align with the centre of the respective pair of armored cores 9, 11, 10, 12.

This ensures variation of the conversion characteristic slope, but on the other hand it might cause the zero point to shift.

In order to avoid shifting the zero point when displacing the shield 4, the bracket 19 has to be additionally moved along the guides 20 until the working edges 17 and 18 are aligned with the centre of a corresponding pair of armored cores 9, 11, 10 and 12. A similar effect can be obtained by using a combination wherein the construction includes a rotatable screen 4 (FIGS. 5 and 6) and rotatable cores 9, 10, 11 and 12 (FIGS. 3 and 4).

Figure 7:
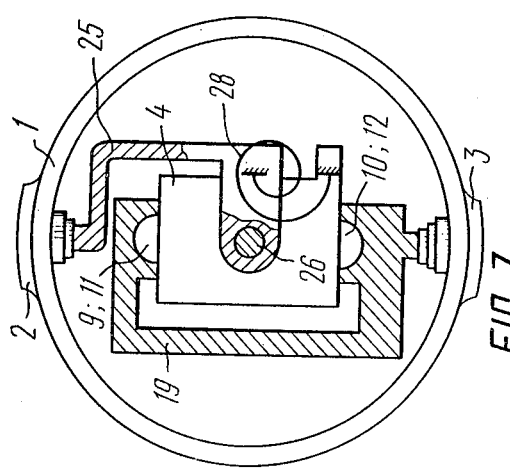
FIG. 7 illustrates an induction-type meter with a corrector drive means such as, for example, a temperature corrector.

FIG. 7 illustrates a diamagnetic screen 4 secured on the pivot 26 in the bracket 25, the screen being coupled with a corrector drive means 28. The specific design of the drive means 28 is determined by the corrected parameter selected.

For example, to effect temperature correction use is made of a bimetal thermal spiral 28 (drive means), one end thereof being connected to the screen 4 and the other end to the bracket 25. With the parameters of the bimetal thermal spiral 28 having been properly selected, the present device will ensure automatic compensation of the temperature effect on the conversion characteristic of the induction-type meter.

Figure 8:
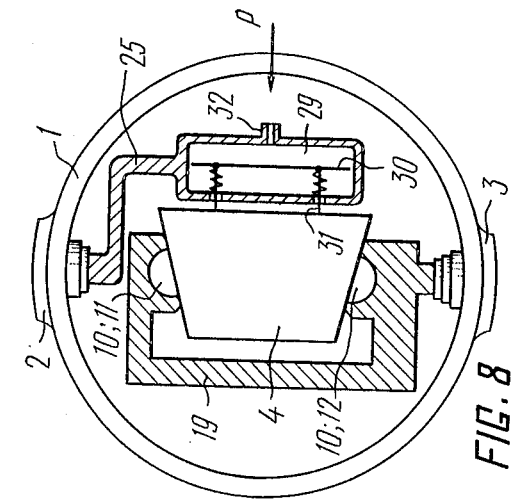
FIG. 8 shows another mebodiment of the corrector (pressure corrector)

FIG. 8 illustrates another embodiment of the corrector drive means for pressure correction. In this case a chamber 29 is provided in the kinematic link defined by the bracket 25 and screen 4, the chamber 29 being separated by a spring-loaded diaphragm 30, connected by means of rods 31 with the screen 4, the chamber 29 communicating with the pressure source "p" by means of an inlet branch pipe 32.

Figure 9:
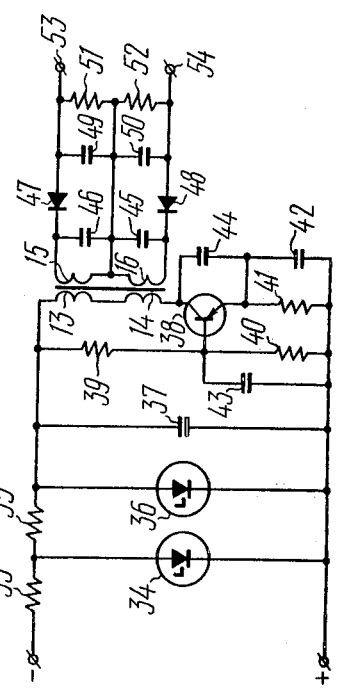
FIG. 9 illustrates the electrical diagram of an induction-type meter for measuring mechanical quantities.

An electric schematic diagram of the induction-type meter for measuring mechanical quantities is shown in FIG. 9.

The diagram comprises a resistor 33 and a Zener diode 34 of a first stabilization stage, resistor 35 and Zener diode 36 of a second stabilization stage, as well as a capacitor 37 which serves as a filter for the alternating voltage of the self-exciting oscillator, (in principle, any known stabilization circuit can be used, provided it is required to meet the operating conditions of the converter). The self-exciting oscillator comprises a transistor 38 and resistors 39 and 40, as a bias circuit, and a resistor 41 serving for current stabilization of the transistor 38, and a capacitor 42 to shunt the alternating current of the resistor 41.

The collector of transistor 38 includes an induction, which induction is formed by the excitation coil 13 and 14 of the displacement converter, which in combination with capacitors 43 and 44 ensures the required conditions for self-excitation of the oscillator.

Capacitors 45 and 46 connected to the measuring coils 15 and 16 form the secondary circuits. The diodes 47 and 48 connected thereto serve for rectifying the alternating current.

After rectification and filtration by capacitors 49 and 50, voltages of equal magnitude and reverse polarity appear across resistors 51 and 52 (in the zero position of the screen 4). Thus the potential difference between points 53 and 54 in this state of the converter is zero.

A differential an connection permits to increase in the accuracy of the induction-type meter, improves the sensitivity thereof by a factor of 2 and ensures the absence of voltage across the output (zero signal) in the initial state of the induction-type meter. When the process of measurement realized by the induction-type meter for measuring mechanical quantities requires a certain level of signal (other than zero) in the initial state, a simple conversion circuit with coils 9 and 11 (FIG. 1) is possible.

The induction-type meter for measuring mechanical quantities operates as follows.

Direct current fed across the supply buses causes excitation of the self-excited oscillator, causing the appearance of sinusoidal voltage across the coils 13 and 14 (FIG. 1).

This voltage creates in the coils 15 and 16 voltages whose amplitude depends on the controlled displacements of the screen 4. In the example of force measurements now considered, the force meter 1 (FIG. 1) is strained under the action of applied load causing the screen 4 and the magnetic system of cores 9, 10, 11 and 12 to be relatively displaced, thereby changing the relationship between the screened coil areas. This leads to a change in the transformation ratio between coils 13, 15 and 14, 16, respectively, with the result that the voltages across the coils 15 and 16 will be different (unlike the initial "zero" state, when these voltages have equal amplitude, the transformation ratio between coils 13, 15 and 14, 16 being equal). The voltages derived from the coils 15 and 16 are rectified by amplitude detectors 47 and 48, smoothed by filters 49 and 50, thereby creating a potential difference between points 53 and 54, which is proportional to the voltage difference across coils 15 and 16, taking into consideration the sign of the difference.

Thus, owing to the relative displacement of the screen 4 and the magnetic system of cores 9, 10, 11 and 12 across the output of the induction-type meter circuit (FIG. 9), there appears a signal which is proportional to this displacement and corresponds to the force applied to the force meter 1 (FIG. 1) in the example considered, and having a sign which takes into account the direction of this displacement.

What is claimed is:

1. An induction-type meter for measuring a controlled mechanical parameter comprising in combination:
   a first converter means for converting the controlled mechanical parameter into a displacement; said first converter means having elements capable of relative movement;
   a second converter means for converting said displacement into an electric signal and comprising a magnetic circuit with a block of coils and a diamagnetic screen;
   said magnetic circuit embodied as a closed-open loop system comprised of two parallel parts formed by armored cores upon which are mounted said coils and arranged to provide a gap; said magnetic circuit being mounted on one of said elements capable of relative movement of said first converter; and wherein
   said diamagnetic screen includes profiled working edges and is secured on the other one of said elements capable of relative movement of said first converter and is disposed in said gap; and
   said meter further including means for varying an inclination angle of said screen with said direction of movement.

2. An induction-type meter for measuring mechanical quantities as claimed in claim 1, wherein said means for varying an inclination angle of said screen with said direction of movement comprises a thermobimetal spiral having one end connected to said screen and the other end connected to a bracket which mounts said screen.

* * * * *